United States Patent
Luo et al.

(10) Patent No.: US 7,555,165 B2
(45) Date of Patent: Jun. 30, 2009

(54) METHOD FOR SEMANTIC SCENE CLASSIFICATION USING CAMERA METADATA AND CONTENT-BASED CUES

(75) Inventors: Jiebo Luo, Pittsford, NY (US); Matthew R. Boutell, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 621 days.

(21) Appl. No.: 10/712,657

(22) Filed: Nov. 13, 2003

(65) Prior Publication Data

US 2005/0105776 A1    May 19, 2005

(51) Int. Cl.
    G06K 9/62    (2006.01)
    G06K 9/00    (2006.01)
(52) U.S. Cl. .................................. 382/224; 382/165
(58) Field of Classification Search .............. 382/224, 382/228, 165
    See application file for complete search history.

(56) References Cited

U.S. PATENT DOCUMENTS

| | | | |
|---|---|---|---|
| 6,727,942 | B1 | 4/2004 | Miyano |
| 7,020,330 | B2 * | 3/2006 | Schroder et al. ............ 382/167 |
| 2002/0080254 | A1 * | 6/2002 | Parulski ................. 348/333.01 |
| 2002/0110372 | A1 * | 8/2002 | Fields ......................... 396/225 |
| 2002/0118967 | A1 * | 8/2002 | Funston ...................... 396/155 |
| 2002/0140843 | A1 * | 10/2002 | Tretter et al. ................ 348/362 |
| 2003/0002715 | A1 * | 1/2003 | Kowald ....................... 382/118 |
| 2003/0009469 | A1 | 1/2003 | Platt et al. |

FOREIGN PATENT DOCUMENTS

WO    WO 03/077549 A1    9/2003

OTHER PUBLICATIONS

Gasparini, F.—"Color correction for digital photographs" —IEEE—Sep. 2003, pp. 646-651.*
Cooper, T.—"Color segmenation as an aid to white balancing for digitial still cameras" —SPIE—2001—vol. 4300, pp. 164-171.*
Boutell, M.—"Sunset scene classification using simulated image recomposition" —IEEE—vol. 1, Jul. 2003, pp. 37-40.*
Luo, J.—"Indoor vs outdoor classification of consumer photographs using low-level and semantic features" —IEEE—vol. 2, Oct. 2001, pp. 745-748.*
Szummer, M.—"Indoor-outdoor image classification" —IEEE—Jan. 1998, pp. 42-51.*
Vivarelli, F.—"Using Bayesian neural networks to classify segmented images" —IEEE—Jul. 1997, pp. 268-273.*
Cooper, T.—"A novel approach to color cast detection and removal in digital images" —SPIE—Jan. 2000, vol. 3963, pp. 167-177.*

(Continued)

Primary Examiner—Jingge Wu
Assistant Examiner—Bernard Krasnic
(74) Attorney, Agent, or Firm—David M. Woods

(57) ABSTRACT

A method for scene classification of a digital image includes extracting pre-determined camera metadata tags from the digital image. The method also includes obtaining estimates of image class based on the extracted metadata tags. In addition, the method includes obtaining estimates of image class based on image and producing a final estimate of image class based on a combination of metadata-based estimates and image content-based estimates.

6 Claims, 4 Drawing Sheets

OTHER PUBLICATIONS

Moser, S.—"Usage of DSC meta tags in a general automatic image enhancement system"—SPIE—2002, vol. 4669, pp. 259-267.*

Regazzoni, C.—"Advanced Video-Based Surveillance Systems"—Publihsed 1999 Springer—p. 134 of 240 pages.*

M. Boutell et al: "Bayesian Fusion of Camera Metadata Cues In Semantic Scene Classification", Proceedings of the 2004 IEEE Computer Society Conference on Computer Vision and Pattern Recognition, IEEE Comput. Soc. Los Alamitos, CA, USA, vol. 2, Jun. 2004, pp. II-623, XP002319660, ISBN: 0-7695-2158-4.

Patent Abstracts of Japan, vol. 2000, No. 06, Sep. 22, 2000 and JP 2000 092509A (Eastman Kodak Japan Ltd.), Mar. 31, 2000 abstract.

Zhaohui Sun ED—Institute of Electrical and Electronics Engineers: "Adaptation for Multiple Cue Integration", Proceedings 2003 IEEE Conference On Computer Vision and Pattern Recognition. CVPR 2003, Madison, WI, Jun. 18-20, 2003, Proceedings of the IEEE Computer Conference on Computer Vision and Pattern Recognition, Los Alamitos, CA, IEEE Comp. Soc. US, vol. 2 of 2, Jun. 18, 2003, pp. 440-445, XP010644931 ISBN: 0-7695-1900-8.

A. Garg et al: "Bayesian Networks as Ensemble of Classifiers" Pattern Recognition, 2002. Proceedings 16th International Conference on Quebec City, QUE., CANADA Aug. 11-15, 2002, Los Alamitos, CA, USA, IEEE Comput. Soc., US, vol. 2, Aug. 11, 2002, pp. 779-784, XP010613997 ISBN: 0-7695-1695-X.

"Indoor-outdoor image classification" by M. Szummer and R. W. Picard in *Proceedings of IEEE Workshop on Content-based Access of Image and Video Databases*, 1998.

"Content-based hierarchical classification of vacation images" by A. Vailaya, M. Figueiredo, A. Jain, and H.J. Zhang. *Proceedings of IEEE International Conference on Multimedia Computing and Systems*, 1999.

"A Computationally Efficient Approach to Indoor/Outdoor Scene Classification" by N. Serrano, A. Savakis, and J. Luo. *Proceedings of International Conference on Pattern Recognition*, 2002.

"Usage of DSC meta tags in a general automatic image enhancement system" by S. Moser and M. Schroder. *Proceedings of International Symposium on Electronic Imaging*, 2002.

"Indoor vs. outdoor classification of consumer photographs using low-level and semantic features" by J. Luo and A. Savakis. *IEEE International Conference on Image Processing*, Thessaloniki, Greece, Oct. 2001.

* cited by examiner

METHOD FOR SEMANTIC SCENE CLASSIFICATION USING CAMERA METADATA AND CONTENT-BASED CUES

FIELD OF THE INVENTION

The present invention is related to image processing, and in particular to image classification using camera and content-based cues.

BACKGROUND OF THE INVENTION

Automatically determining the semantic classification (e.g., indoor, outdoor—sunset, picnic, beach) of an arbitrary image is a difficult problem. Much research has been done recently, and a variety of classifiers and feature sets have been proposed. The most common design for such systems has been to use low-level features (e.g., color, texture) and statistical pattern recognition techniques. Such systems are exemplar-based, relying on learning patterns from a training set. Examples are M. Szummer and R. W. Picard, "Indoor-outdoor image classification", in *Proceedings of IEEE Workshop on Content-based Access of Image and Video Databases*, 1998, and A. Vailaya, M. Figueiredo, A. Jain, and H. J. Zhang, "Content-based hierarchical classification of vacation images", in *Proceedings of IEEE International Conference on Multimedia Computing and Systems*, 1999.

Semantic scene classification can improve the performance of content-based image organization and retrieval (CBIR). Many current CBIR systems allow a user to specify an image and search for images similar to it, where similarity is often defined only by color or texture properties. This so-called "query by example" has often proven to be inadequate due to its simplicity. Knowing the category of a scene a priori helps narrow the search space dramatically. For instance, knowing what constitutes a party scene allows us to consider only party scenes in our search to answer the query "Find pictures of Mary's birthday party". This way, the search time is reduced, the hit rate is higher, and the false alarm rate is expected to be lower.

Classification of unconstrained consumer images in general is a difficult problem. Therefore, it can be helpful to use a hierarchical approach, in which classifying images into indoor or outdoor images occurs at the top level and is followed by further classification within each subcategory, as suggested by Vailaya et al.

Still, current scene classification systems often fail on unconstrained image sets. The primary reason appears to be the incredible variety of images found within most semantic classes. Exemplar-based systems must account for such variation in their training sets. Even hundreds of exemplars do not necessarily capture all of the variability inherent in some classes.

Consequently, a need exists for a method that overcomes the above-described deficiencies in image classification.

While the advent of digital imaging created an enormous number of digital images and thus the need for scene classification (e.g., for use in digital photofinishing and in image organization), it also brings with it a powerful source of information little-exploited for scene classification: camera metadata embedded in the digital image files. Metadata (or "data about data") for cameras includes values such as date/time stamps, presence or absence of flash, exposure time, and aperture value. Most camera manufacturers today store metadata using the EXIF (EXchangeable Image File Format) standard (http://www.exif.org/specifications.html).

SUMMARY OF THE INVENTION

The present invention is directed to overcoming one or more of the problems set forth above. Briefly summarized, according to one aspect of the present invention, the invention resides in a method for using of camera metadata for scene classification, where the method comprises the steps of: (a) extracting pre-determined camera metadata tags from a digital image; (b) obtaining estimates of image class based on the extracted metadata tags, thereby providing a metadata-based estimate; (c) obtaining estimates of image class based on image content, thereby providing an image content-based estimate; and (d) producing a final estimate of image class based on a combination of the metadata-based estimate and the image content-based estimate.

The present invention provides a method for image classification having the advantage of (1) robust image classification by combining image content and metadata when some or all of the useful metadata is available using a Bayesian inference engine, and (2) extremely fast image classification by using metadata alone (which can be retrieved and processed using negligible computing resources) and without any content-based cues.

These and other aspects, objects, features and advantages of the present invention will be more clearly understood and appreciated from a review of the following detailed description of the preferred embodiments and appended claims, and by reference to the accompanying drawings.

DESCRIPTION OF THE PREFERRED EMBODIMENT

Figure 1:
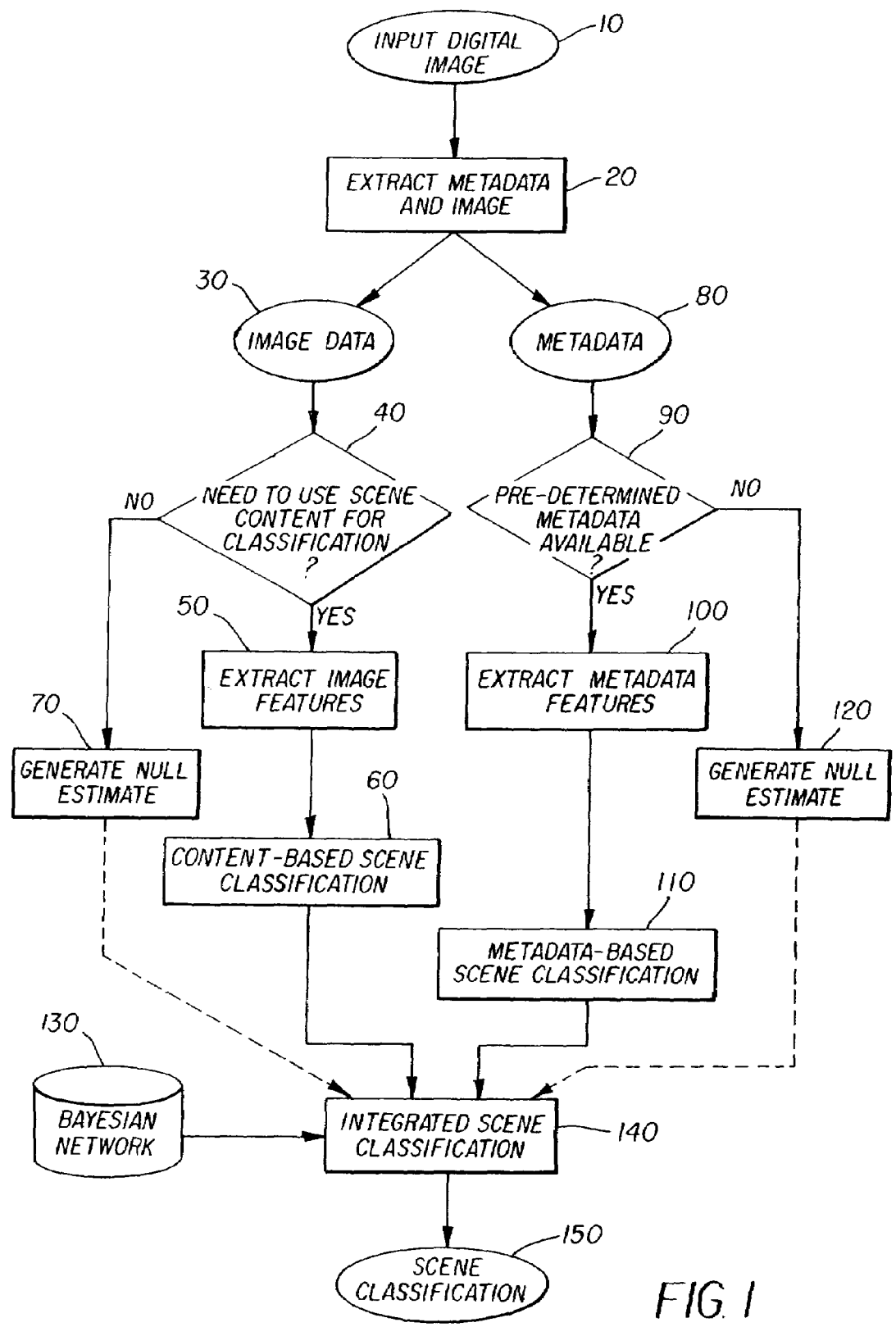
FIG. 1 is a diagram illustrating elements of a method for practicing the present invention.

The present invention will be described as implemented in a programmed digital computer. It will be understood that a person of ordinary skill in the art of digital image processing and software programming will be able to program a computer to practice the invention from the description given below. The present invention may be embodied in a computer program product having a computer readable storage medium such as a magnetic or optical storage medium bearing machine readable computer code. Alternatively, it will be understood that the present invention may be implemented in hardware or firmware.

The present invention describes the use of camera metadata for scene classification, and in particular a preferred embodiment for solving the problem of indoor-outdoor scene classification. It is also demonstrated that metadata alone (which can be retrieved and processed using negligible computing resources) can be used as an "Ultra-Lite" version of the indoor-outdoor scene classifier, and can obtain respectable results even when used alone (without any content-based cues). A preferred inference engine (a Bayesian network) is used to combine evidence from a content-based classifier and from the metadata, which is especially useful when some or all of the metadata tags are missing.

Classification of unconstrained consumer images in general is a difficult problem. Therefore, it can be helpful to use a hierarchical approach, in which classifying images into indoor or outdoor images occurs at the top level and is followed by further classification within each subcategory (See A. Vailaya, M. Figueiredo, A. Jain, and H. J. Zhang, "Content-based hierarchical classification of vacation images", in *Proceedings of IEEE International Conference on Multimedia Computing and Systems*, 1999). In the present invention, a baseline content-based classifier in-house for indoor/outdoor classification (IOC) is implemented as described by Serreno at al. (See N. Serrano, A. Savakis, and J. Luo, "A Computationally Efficient Approach to Indoor/Outdoor Scene Classification", in *Proceedings of International Conference on Pattern Recognition*, 2002). Briefly summarized, a plurality of color and textures features are first extracted from image sub-blocks in a 4×4 tessellation and then used as the input to a Support Vector Machine which generates estimates for individual sub-blocks, and these estimates are combined to provide an overall classification for the entire image as either an indoor or outdoor image.

In general, most digital cameras encode metadata in the header of the Exif file. Among the metadata tags, and of potential interest to scene classification, are DateTime, FlashUsed, FocalLength (FL), ExposureTime (ET), ApertureFNumber (AP), (Subject) Distance, ISOequivalent, BrightnessValue (BV), SubjectDistanceRange (SD), and Comments. A large body of research is concerned with the combination of text (e.g., Comments and key word annotations) and image retrieval (See, for example, Y. Lu, C. Hu, X. Zhu, H. J. Zhang, and Q. Yang, "A unified framework for semantics and feature based relevance feedback in image retrieval systems", in *ACM Multimedia Conference*, Los Angeles, Calif., October 2000), which, however, are not the subject of the present invention.

Other metadata fields appear to discern certain scene types, even if weakly. For example, flash tends to be used more frequently on indoor images than on outdoor images. Because sky is brighter than indoor lighting, the exposure time on outdoor images is often shorter than on indoor images. In general, only outdoor images can have a large subject distance. Sunset images tend to have a brightness value within a certain range, distinct from that of mid-day sky or of artificial lighting. It is clear that some tags will be more useful than others for a given problem. In a preferred embodiment of the present invention, the tags that are most useful for the problem of indoor-outdoor scene classification are identified through statistical analysis.

Other metadata can be derived from the recorded metadata. For instance, Moser and Schroder (See S. Moser and M. Schroder, "Usage of DSC meta tags in a general automatic image enhancement system", in *Proceedings of International Symposium on Electronic Imaging*, 2002) defined scene pseudo-energy to be proportional to $$\ln\left(\frac{t}{f^2}\right),$$

for exposure time t and aperture f-number f. Scene energy was proposed as a metric highly correlated with scene types and different illuminations. Note that Moser and Schroder do not teach scene classification in general using metadata. They use metadata, and metadata only, to decide what proper image enhancement process to apply.

Three families of tags useful for scene classification in general and indoor-outdoor scene classification in particular are categorized in the following:

Distance (subject distance, focal length). With few exceptions, only outdoor scenes contain large distances. While less direct and less intuitive than subject distance, focal length is related to distance (in the camera's auto-focus mode); however, it would be expected to be far less reliable, because although the zoom-in function is more likely to be used for distant outdoor objects, it is also used for close-ups in indoor pictures; zoom-out is used with equal likelihood for both indoor and outdoor occasions to expand the view.

Scene Brightness (exposure time, aperture, brightness value, shutter speed). Overall, outdoor scenes are brighter than indoor scenes, even under overcast skies, and therefore have a shorter exposure time, a smaller aperture, and a larger brightness value. The exception to this, of course, is night outdoor scenes (which arguably should be treated as indoor scenes for many practical applications).

Flash. Because of the lighting differences described above, (automatic) camera flash is used on a much higher percentage of images of indoor scenes than of outdoor scenes.

Figure 5:
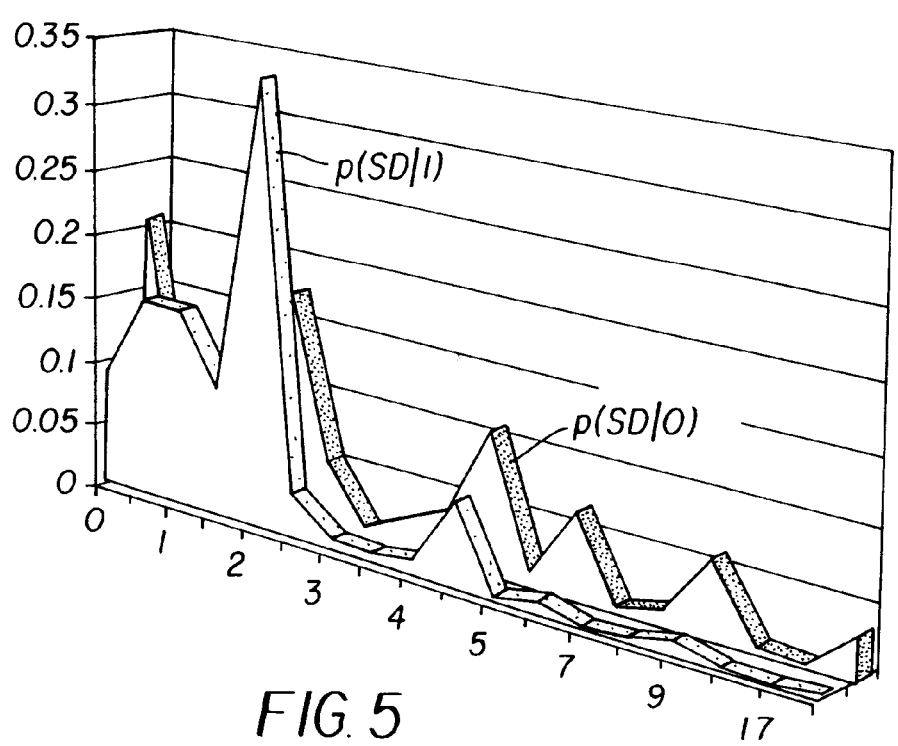
FIG. 5 shows an example distribution of subject distance (SD) of indoor and outdoor scenes, where the large peak for outdoor scenes occurs at infinity (long-range scenery images).

Statistics of various metadata tags, comparing distributions over indoor images with those over outdoor images, are described here. The statistics are presented as probabilities: proportions of images of each type that take on a given certain metadata value. FIG. 5 shows the distribution of subject distance (SD). Most indoor scenes have a distance of between 1-3 meters, while outdoor scenes have a relatively flat distribution of distances, except for a peak at infinity, corresponding to long-range scenery images.

Figure 2:
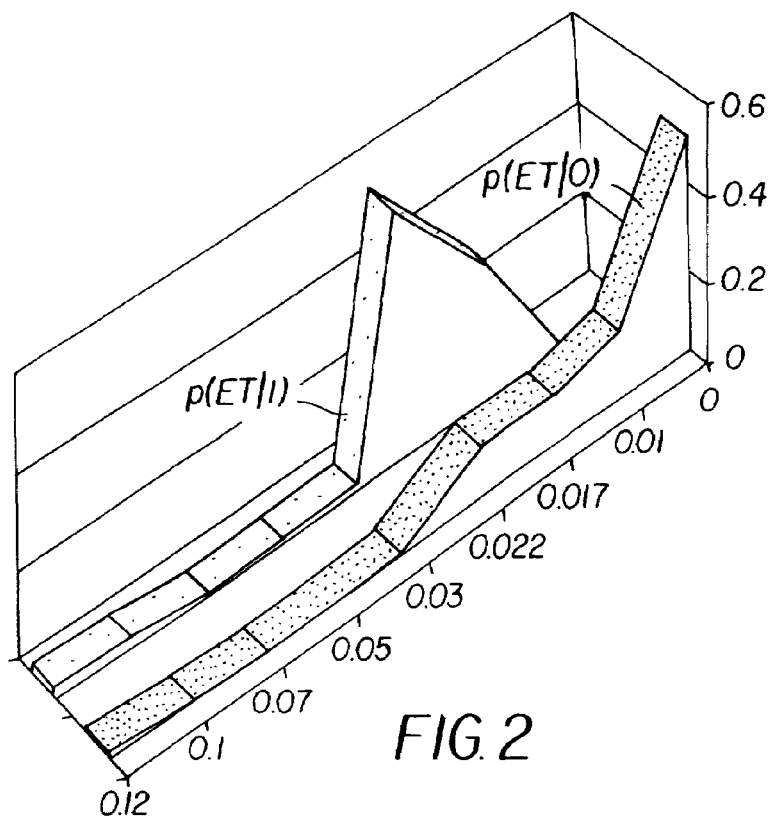
FIG. 2 shows an example distribution of exposure times (ET) of indoor and outdoor scenes, where exposure times over ¼s (0.022) second are more likely to be indoor scenes, because of lower lighting.
Figure 3:
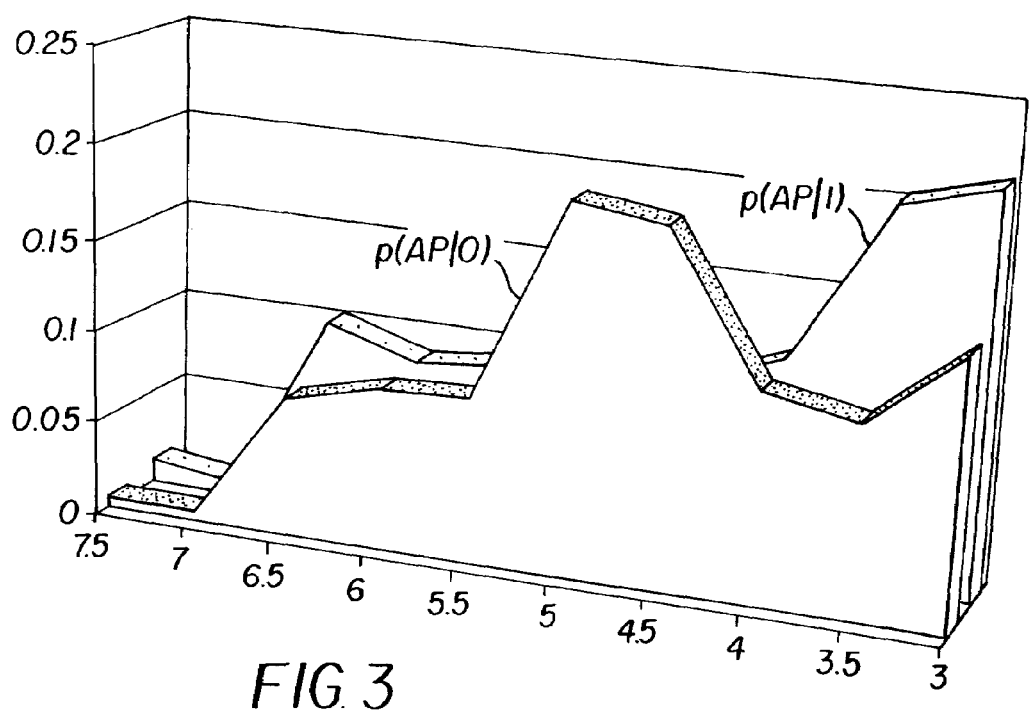
FIG. 3 shows an example distribution of aperture (AP) of indoor and outdoor scenes.
Figure 4:
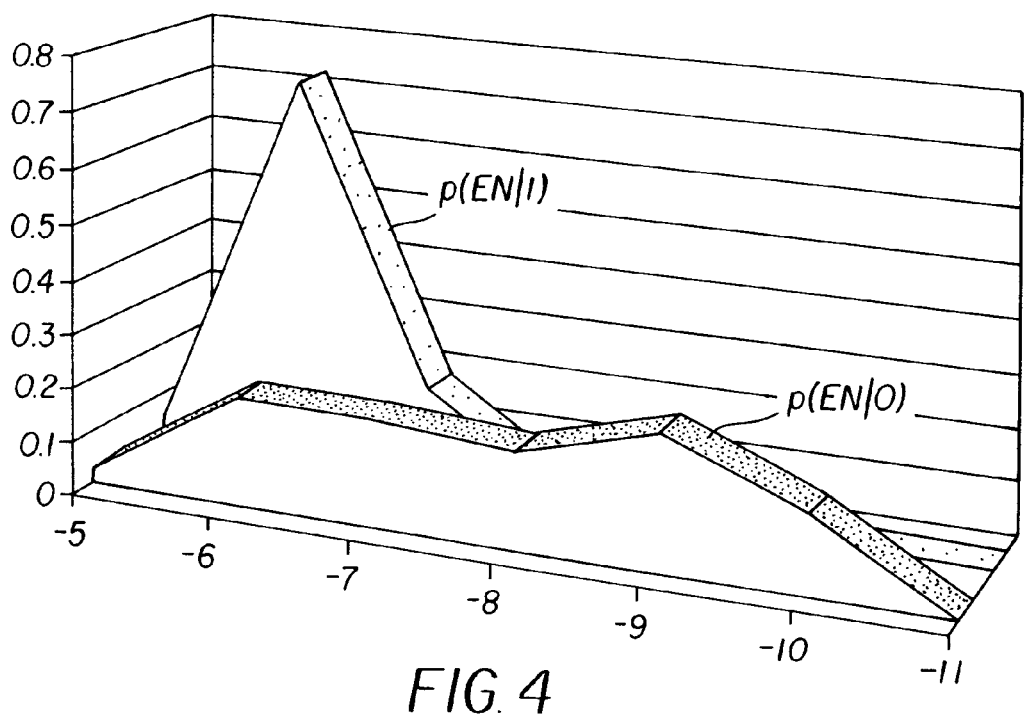
FIG. 4 shows an example distribution of scene energy (SE) of indoor and outdoor scenes.

FIG. 2 shows the distributions of exposure times (ET). Those over ¹⁄₄₅ (0.022) second are more likely to be indoor scenes, because of lower lighting. However, extremely long exposure times (over 1 second) are usually night scenes with the exposure time set manually. FIG. 3 shows the distribution of aperture values (AP), which appear to be less discriminatory than other tags. FIG. 4 shows the distribution of scene energy (SE) as a function of exposure time and f-number (defined by Moser and Schroder). Note that scene energy does not appear to be as good a feature for discriminating indoor scenes from outdoor scenes as, for example, exposure time.

Table 1 presents typical camera flash statistics. It is clear that flash is a strong cue for indoor-outdoor scene classification.

TABLE 1

| | Distribution of flash. | |
|---|---|---|
| Class | P(on | scene class) | P(off | scene class) |
| Indoor | 0.902 | 0.098 |
| Outdoor | 0.191 | 0.809 |

Scene brightness and exposure time, in particular, are highly correlated to the illuminants present in the captured scenes. The choice of metadata tags in the preferred embodiment is largely motivated by this physical property of illuminant and the apparent separabilities shown by these plots.

Figure 6:
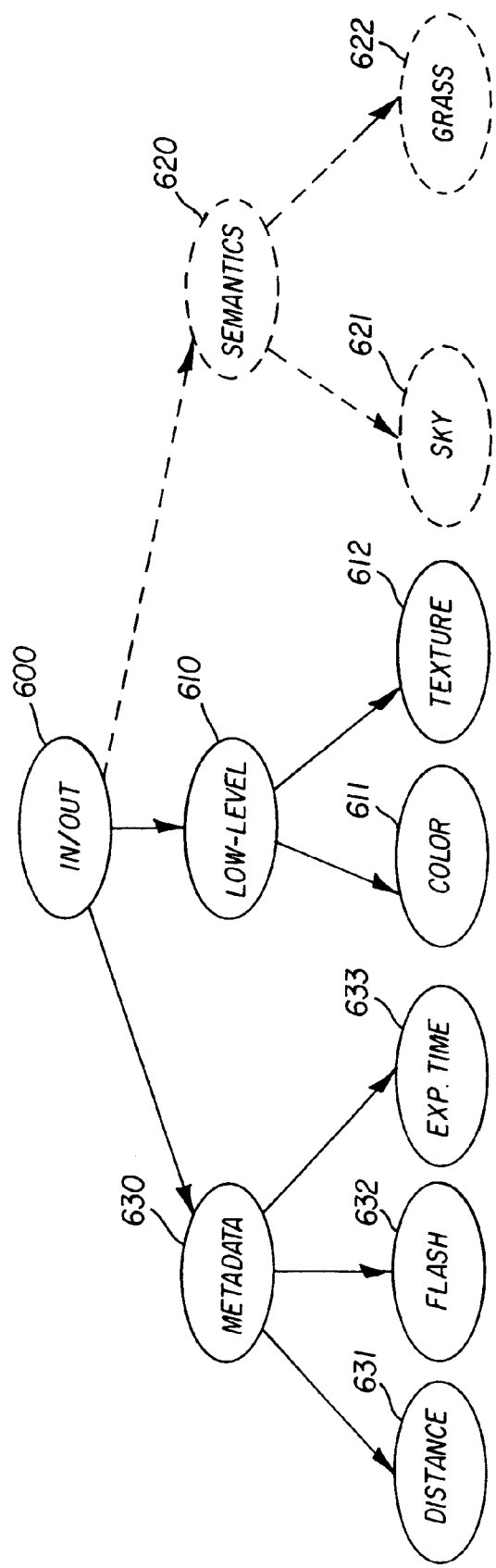
FIG. 6 shows an example of the Bayesian Network.

A Bayesian network is a robust method for combining multiple sources of probabilistic information (See, for example, J. Luo and A. Savakis, "Indoor vs. outdoor classification of consumer photographs using low-level and semantic features", in *IEEE International Conference on Image Processing*, Thessaloniki, Greece, October 2001). In the preferred embodiment of the present invention, a Bayesian net of the topology shown in FIG. 6 is used to fuse low-level image cues 610 and metadata cues 630. The low-level input is pseudo-probabilistic, generated by applying a sigmoid function to the output of the low-level scene classifier (e.g., a Support Vector Machine Classifier, see Serrano at al.). The metadata input is either binary (e.g., flash fired) or discrete (e.g., exposure time is divided into discrete intervals, and the exposure time for a single test image falls into exactly one of those intervals).

Referring again to FIG. 6, scene classification of an image into either indoor or outdoor is achieved at the root node 600 once the Bayesian network is settled after belief propagation. There are three types of potential evidences (cues), namely low-level cues 610, semantic cues 620, and metadata cues 630, that can contribute to the final scene classification. Examples of low-level image features 610 include "color" 611 and "texture" 612. Examples of semantic cues 620 include "sky" 621 and "grass" 622, which are strong indicators of outdoor scenes. The corresponding broken lines related to semantic features 621 and 622 simply indicate that semantic features are not used in the preferred embodiment of the present invention because it would be a natural extension. FIG. 6 shows only a few of the potential input cues that could be used for metadata, i.e., "subject distance" 631, "flash fired" 632, and "exposure time" 633. For indoor-outdoor scene classification, they are the best of the categories discussed previously. If used, nodes for other metadata, such as the aforementioned "brightness value" or "scene energy", would be siblings of the existing metadata nodes.

Bayesian networks are very reliable in the presence of (either partially or completely) missing evidence. This is ideal when dealing with metadata, because some tags, e.g., subject distance, are often not given a value by many camera manufacturers.

There are a few issues related to the proper combination of multiple cues. First, combining multiple cues of the same category (e.g. brightness value, exposure time, and scene energy) would hurt the classifiers' accuracy due to the violation of the conditional independence necessary for Bayesian networks. Second, the most reliable cues, when used in combination, appear to be exposure time, flash, and subject distance, in that order. Third, combining multiple cues from different categories (e.g., exposure time and flash) does improve accuracy. In practice, the highest accuracy is achieved when using exactly one (the best) of each of the cue types (exposure time, flash, and subject distance).

While the low-level cues were less accurate in general and the camera metadata cues were more reliable, combining low-level and metadata cues gave the highest accuracy.

In practice, not all cameras store metadata and among those that do, not all the useful metadata tags are available. Therefore, a more accurate measure of performance of the combined system should take missing metadata into account. Table 2 shows example statistics on the richness of the metadata that is currently typically available in the market.

TABLE 2

Availability of metadata tags.

| Category | Percentage of Entire Data set | Percentage of those images with any metadata |
|---|---|---|
| Any metadata | 71% | 100% |
| Exposure time | 70% | 98% |
| Flash | 71% | 100% |
| Flash (strength) | 32% | 45% |
| Subject Distance | 22% | 30% |
| Brightness | 71% | 100% |
| Date and Time | 69% | 96% |

Using the same data set but simulating the actual availability of metadata according to Table 2, the overall accuracy increase is about 70% of the best-case scenario (with all tags). This is a more realistic estimate of how the method might do with general consumer images, because metadata is not yet fully supported by all camera manufacturers.

FIG. 1 shows a diagram of the method for scene classification of a digital image using camera and content-based cues according to the invention. Initially, an input image 10 is provided. The input image is processed 20 to extract metadata and image data. The image data 30 and the metadata 80 will be processed separately in two paths. If it is decided that there is a need to use scene content for image classification in step 40, a plurality of image features, such as color, texture or even semantic features, are extracted directly from the image data 30 in step 50. Content-based scene classification is performed in step 60 using the image-based features and a trained classifier such as a support vector machine. Otherwise if there is no need to use scene content for classification, a "null" estimate is generated in step 70. A "null" estimate has no effect on a subsequent integrating scene classification step 140. In the meantime, if pre-determined metadata tags are found to be available in step 90 among the extracted metadata 80, they are extracted in step 100 and then used to generate metadata-based scene classification estimates in step 110. Otherwise, a "null" estimate is generated in step 120. Again, a "null" estimate has no effect on the subsequent integrating scene classification step 140. The estimates from both the image data path and the metadata path are combined to produce an integrated scene classification 150 in the integrating scene classification step 140 according to the invention. In a preferred embodiment of the present invention, a pre-determined (trained) Bayesian network 130 is used to perform the integration. As indicated by the broken lines connecting the "null" estimate generation steps of 70 and 120, the method according to the present invention can allow either one of the processing paths to be missing (e.g., metadata), or turned off (e.g., content-based classification) for speed and accuracy reasons, within a unified system.

As mentioned in the Background section, scene classification can improve the performance of image-based systems, such as content-based image organization and retrieval. Scene classification can also find application in image enhancement. Rather than applying generic color balancing and exposure adjustment to all scenes, we could customize them to the scene, e.g., retaining or boosting brilliant colors in sunset images while removing warm-colored cast from tungsten-illuminated indoor images. For instance, a method for image enhancement of a digital image according to the present invention could include the steps of: (a) performing scene classification of the digital image into a plurality of scene classes based on image feature and metadata; and (b) applying a customized image enhancement procedure in response to the scene class of the digital image. Thereupon, in a given situation wherein the image enhancement is color balancing, the customized image enhancement procedure could include retaining or boosting brilliant colors in images classified as sunset scenes and removing warm-colored cast from indoor images classified as tungsten-illuminated scenes.

The invention has been described with reference to a preferred embodiment. However, it will be appreciated that variations and modifications can be effected by a person of ordinary skill in the art without departing from the scope of the invention.

PARTS LIST

| | |
|---|---|
| 10 | original input digital image |
| 20 | extracting metadata and image step |
| 30 | image data |
| 40 | deciding to use scene content for classification step |
| 50 | extracting image features step |
| 60 | content-based scene classification step |
| 70 | generating null estimate step |
| 80 | metadata |
| 90 | deciding pre-determined metadata availability step |
| 100 | extracting metadata step |
| 110 | metadata-based scene classification step |
| 120 | generating null estimate step |
| 130 | Bayesian network |
| 140 | integrating scene classification step |
| 150 | final scene classification |
| 600 | root node of the Bayesian network |
| 610 | low-level features node |
| 611 | color feature node |
| 612 | texture feature node |
| 620 | semantic features node |
| 621 | "sky" feature node |
| 622 | "grass" feature node |
| 630 | metadata features node |
| 631 | "subject distance" feature node |
| 632 | "flash fired" feature node |
| 633 | "exposure time" feature node |

What is claimed is:

1. A method for scene classification of a digital image comprising the steps of:
   (a) extracting one or more pre-determined camera metadata tags from the digital image;
   (b) generating an estimate of image class of the digital image based on (1) the extracted camera metadata tags and not (2) image content features using a first data processing path, thereby providing a metadata-based estimate based only on the extracted camera metadata tags or generating a metadata null estimate;
   (c) generating, separately from the metadata-based estimate, another estimate of image class of the digital image based on (1) image content features and not (2) the extracted camera metadata tags using a second data processing path separate from the first data processing path, thereby providing an image content-based estimate based only the image content features or generating a content-based null estimate; and
   (d) producing a final integrated estimate of image class of the digital image using a Bayesian network based on a combination of 1) the metadata-based estimate and the image content-based estimate, 2) the metadata-based estimate and the image-based null estimate, or 3) the image content-based estimate and the metadata null estimate;
   wherein steps (b), (c) and (d) are each implemented using a computing device.

2. The method as claimed in claim 1 wherein the metadata extracted in step (a) includes one or more of exposure time, aperture, shutter speed, brightness value, subject distance and flash fired.

3. The method as claimed in claim 1 wherein the image content features in step (c) include one or more of color, texture and semantic features.

4. The method as claimed in claim 1, further comprising the step of applying a customized image enhancement procedure to the digital image in response to the final estimate of image class of the digital image.

5. The method as claimed in claim 4, wherein the customized image enhancement procedure is color balancing and the customized image enhancement procedure includes retaining or boosting brilliant colors in images classified as sunset scenes and removing warm-colored cast from indoor images classified as tungsten-illuminated scenes.

6. A computer-readable medium storing a computer program for causing a computer to implement a method for scene classification of a digital image comprising the steps of:
   (a) extracting one or more pre-determined camera metadata tags from the digital image;
   (b) generating an estimate of image class of the digital image based on (1) the extracted camera metadata tags and not (2) image content features using a first data processing path, thereby providing a metadata-based estimate based only on the extracted camera metadata tags or generating a metadata null estimate;
   (c) generating, separately from the metadata-based estimate, another estimate of image class of the digital image based on (1) image content features and not (2) the extracted camera metadata tags using a second data processing path separate from the first data processing path, thereby providing an image content-based estimate based only the image content features or generating a content-based null estimate; and
   (d) producing a final integrated estimate of image class of the digital image using a Bayesian network based on a combination of 1) the metadata-based estimate and the image content-based estimate, 2) the metadata-based estimate and the image-based null estimate, or 3) the image content-based estimate and the metadata null estimate.

* * * * *

UNITED STATES PATENT AND TRADEMARK OFFICE
CERTIFICATE OF CORRECTION

PATENT NO. : 7,555,165 B2
APPLICATION NO. : 10/712657
DATED : June 30, 2009
INVENTOR(S) : Jiebo Luo et al.

It is certified that error appears in the above-identified patent and that said Letters Patent is hereby corrected as shown below:

Title Page; item (56);

| Issued Patent | | Description of Error |
|---|---|---|
| Column | Line | |
| First Page Column 2 (Other Publications) | 3 | Delete "segmenation" and insert -- segmentation --, therefor. |
| First Page Column 2 (Other Publications) | 4 | Delete "digitial" and insert -- digital --, therefor. |
| 8 | 40 | In Claim 6, delete "separately" and insert -- separately --, therefor. |

Signed and Sealed this

Sixteenth Day of March, 2010

David J. Kappos
*Director of the United States Patent and Trademark Office*